July 19, 1960  M. RICCITIELLO ET AL  2,945,264
METHOD FOR PRODUCING MASSIVE SOLID HOMOGENEOUS
BODIES OF POLYETHYLENE HAVING A THICKNESS
OF THE ORDER OF SEVERAL INCHES
Filed Feb. 12, 1957
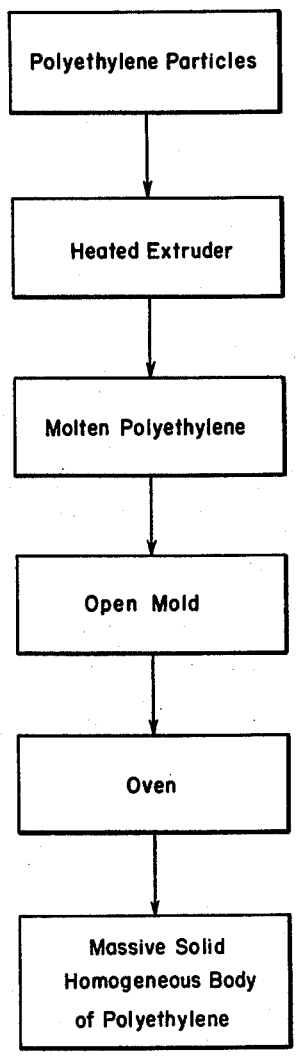
WITNESSES:
INVENTORS
Michael Riccitiello &
Joseph J. Wachter.
BY
ATTORNEY – # United States Patent Office

2,945,264

METHOD FOR PRODUCING MASSIVE SOLID HOMOGENEOUS BODIES OF POLYETHYLENE HAVING A THICKNESS OF THE ORDER OF SEVERAL INCHES

Michael Riccitiello, Fairfax, S.C., and Joseph J. Wachter, Doylestown, Pa., assignors to Westinghouse Electric Corporation, East Pittsburgh, Pa., a corporation of Pennsylvania Filed Feb. 12, 1957, Ser. No. 639,645

1 Claim. (Cl. 18—58)

This invention relates to the production of massive homogeneous bodies of polyethylene and particularly to a method for molding massive bodies of polyethylene.

Polyethylene is a versatile material and has proven highly useful for many applications. The fabrication of members of many shapes from polyethylene by various methods is well known in the art. The preparation of massive homogeneous members of polyethylene has, however, proven extremely difficult and has therefore limited its application. Thus, injection molding is employed to produce relatively small members, and extrusion molding is used to produce relatively thin walled tubular members and sheet material.

The object of this invention is to provide for the preparation of massive homogeneous bodies of polyethylene that possess good physical properties.

Another object of this invention is to provide a method for producing massive polyethylene members which comprises heating polyethylene in extrusion devices to a temperature at which it becomes a flowable viscous mass relatively free from air bubbles, depositing the fluid polyethylen into a mold, and thereafter heat treating the molded member to improve its physical properties.

Other objects of the invention will, in part, be obvious and will, in part, appear hereinafter. For a better understanding of the nature and objects of the invention, reference should be had to the following detailed description taken in conjunction with the accompanying drawing, the single figure of which is a schematic view in diagrammatic form illustrating the method of this invention.

In accordance with this invention, massive bodies of polyethylene have been produced that possess good physical properties. The massive bodies of polyethylene are homogeneous and are substantially free from voids and air pockets.

Briefly the invention comprises heating polyethylene particles to a temperature where the polyethylene becomes a molten viscous mass, flowing the molten polyethylene into a previously prepared mold, and then subjecting the cast polyethylene to a heat treatment to improve its physical properties.

A great variety of solid polymers of polyethylene can be suitably molded by employing the process of this invention. It is preferred, however, to employ polyethylene polymers having an average molecular weight of from 10,000 to 40,000 and higher. These polyethylene polymers usually have a softening temperature of from about 100° C. to about 120° C. At the temperatures where fusion may begin the polymer is not a readily flowable fluid, and a higher temperature, of the order of about 200° C., is required before the polyethylene is fluid enough for use in this process.

The molding procedure of this invention comprises, first, charging or passing into an extruder particles of polyethylene. The relatively small particles of polyethylene commercially available may be employed. The extruder is of any conventional type which is provided with a heating jacket and an extrusion worm.

After the polyethylene has been charged into the extruder, the polyethylene particles are moved by the extrusion worm under pressure whereby they are heated to a temperature at which they soften and fuse together. The agitation and pressure applied by the extrusion screw, work out any air or gas in the polyethylene. In progressing through the extruder the polyethylene is heated to progressively higher temperatures, until near the extruder outlet it is a flowable viscous mass. The temperature of the mass will be well above the fusion temperature of the polyethylene and will usually be of the order of about 200° C. to 300° C. Temperatures of 200° C. are satisfactory for low molecular weight polyethylene, while high molecular weight polyethylene may be at 300° C. or slightly higher, but below the decomposition temperature.

The molten polyethylene flows slowly under no pressure from the extruder outlet in a hot continuous viscous mass into a previously prepared open mold. The mass of hot viscous polyethylene droops by the effect of gravity and is deposited in the mold in layers until the mold is filled to the desired extent. As each layer is deposited it coalesces with the previously deposited layer, resulting in a homogeneous mass or body of polyethylene. The viscous polyethylene has sufficient fluidity so that it will flow into all the open spaces in the mold, and the resulting cast member will have a smooth uniform surface.

The mold may be prepared from sheet stainless steel. Parting compounds may be applied to the mold, but are not necessary.

Immediately after the mold has been filled, the molded polyethylene members are subjected to a heat treatment to reduce non-homogeneous shrinkage and to eliminate any voids or gas pockets that may be present in the molded member.

To heat treat the molded member, the mold containing the hot molded polyethylene member is placed in an oven that is maintained at a temperature of from about 10° C. to 100° C. above the softening temperature of the polyethylene. The period of time that the mold containing the cast polyethylene member is in the oven will largely depend upon the massiveness of the molded polyethylene member. Usually a period of time of the order of about one hour will be sufficient for a member four inches in thickness although this time may be extended to a period of about 4 hours if necessary, without any untoward effects.

The heat treatment of the cast polyethylene member may be eliminated, if desired. After the massive polyethylene body has been produced, the mold containing the cast polyethylene member is cooled to room temperature and the cast member removed.

Annular members of polyethylene having a thickness of about 4 inches, an outer diameter of five feet and an inner diameter of about 2 feet have been produced in accordance with this invention. The annular members had good physical properties and were substantially free from voids and gas pockets.

In producing the annular members mentioned above, an annular mold was first prepared from ⅛ inch thick stainless steel. The annular mold was open at the top, was about four inches deep, had an outer diameter of about 5 feet and an inner diameter of about two feet. Polyethylene particles were passed into an extruder and heated to a temperature of about 250° C., and the resulting molten viscous polyethylene mass was flowed from the extruder and deposited in layers in the annular mold until the mold was filled. This required approximately 300 pounds of polyethylene and the time required to fill the mold was about one-half an hour. The filled annular mold was placed in an oven maintained at a temperature of about 150° C. for about two hours and then allowed to cool slowly in the oven for several hours. The filled mold was then removed and cooled to room temperature.

Polyethylene members having a thickness of from 4 inches to 12 inches, a width of from 1 foot to 6 feet, and a length of many feet have been produced in accordance with this invention. Also massive members having intricate shapes such as rings, wedges and the like can be produced. The massive members are homogeneous, have good physical properties, and are substantially free from voids and air pockets. The massive cast members can be readily machined, cut or otherwise handled.

It will be understood that the above description is exemplary and not in limitation of the invention.

We claim as our invention:

A method for producing massive solid bodies of polyethylene having a thickness of the order of several inches which comprises (1) passing particles of polyethylene having an average molecular weight of from about 10,000 to 40,000 into an extruder wherein the polyethylene is heated under pressure and agitated whereby air is expelled and the polyethylene melted and brought to a temperature of from about 200° C. to 300° C. to form a molten viscous mass of polyethylene substantially free from pores and gas bubbles, (2) flowing the molten polyethylene out of the extruder in a hot viscous continuous stream, (3) depositing the hot viscous stream of molten polyethylene into an open mold in layers until the mold is filled to the desired extent, each layer of polyethylene coalescing with the previously deposited layers, said flowing and depositing being done at atmospheric pressure and in contact with air, (4) placing the mold containing the hot molded polyethylene into a heated oven maintained at a temperature of from about 10° C. to 100° C. above the softening temperature of the polyethylene for a period of time of the order of one hour, (5) thereafter cooling the mold containing the polyethylene body slowly to room temperature, and (6) removing the formed massive body of polyethylene from the mold, said massive body of polyethylene being formed without the application of external pressure and being substantially homogeneous and free from voids and gas pockets.

References Cited in the file of this patent

UNITED STATES PATENTS

| | | |
|---|---|---|
| 2,367,173 | Martin | Jan. 9, 1945 |
| 2,385,318 | Wiley | Sept. 18, 1945 |
| 2,528,523 | Kent | Nov. 7, 1950 |
| 2,757,416 | Montross | Aug. 7, 1956 |

FOREIGN PATENTS

| | | |
|---|---|---|
| 567,012 | Great Britain | Jan. 24, 1945 |

OTHER REFERENCES

"Polyethylene," Raff & Allison, High Polymers, vol. XI, Interscience Publishers Inc., N. W., 1956, page 421, sec. 8.10 casting. (Copy in Division 31.)